United States Patent [19]
Gaspar et al.

[11] Patent Number: 5,592,038
[45] Date of Patent: Jan. 7, 1997

[54] UNIT PROVIDING VENTILATION AND AN ELECTRICAL CONNECTOR INTENDED FOR AN ENVIRONMENTALLY SEALED MOTOR, AND AN ENVIRONMENTALLY SEALED MOTOR USING SUCH A UNIT

[75] Inventors: Arsène Gaspar, Morangis; Jean-Michel Pigeau, Bretigny sur Orge, both of France

[73] Assignee: Valeo Systemmes d'Essuyage, Montigny-le-Bretonneux, France

[21] Appl. No.: 266,002

[22] Filed: Jun. 27, 1994

[30] Foreign Application Priority Data

Jun. 30, 1993 [FR] France ................... 93 07984

[51] Int. Cl.$^6$ ............. H02K 11/00; H02K 5/10; H02K 5/22
[52] U.S. Cl. ................... 310/71; 310/58; 310/88
[58] Field of Search ...................... 310/71, 88, 58

[56] References Cited

U.S. PATENT DOCUMENTS 2,548,614  4/1951  Peters ........................ 310/71
2,776,385  1/1957  Modrey ....................... 310/71
4,808,871  2/1989  Morishita et al. ............. 310/89

FOREIGN PATENT DOCUMENTS 0360623   3/1990  European Pat. Off. .
8809886   9/1988  Germany .
3810960   10/1989  Germany .

*Primary Examiner*—Clayton E. LaBalle
*Attorney, Agent, or Firm*—Morgan & Finnegan, LLP

[57] ABSTRACT

The invention provides an electricity supply connector passing through a cover of an environmentally sealed motor which incorporates a ventilation aperture. The unit of the invention provides ventilation and an electrical connector. It has a plate equipped with through holes for connecting pins to form an electrical connector. Baffle-forming means also are provided through bores which open towards the outside of the environmentally sealed motor on which the unit is mounted.

7 Claims, 2 Drawing Sheets

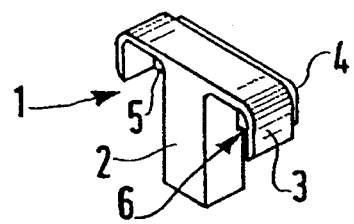
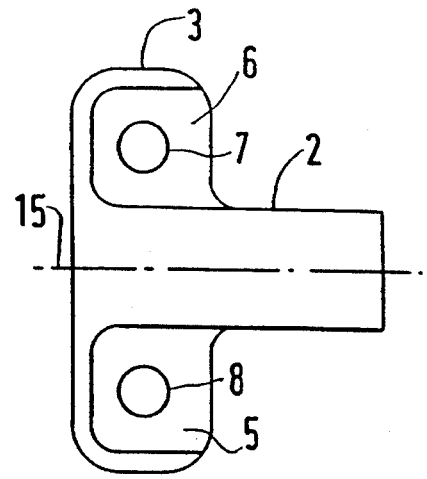
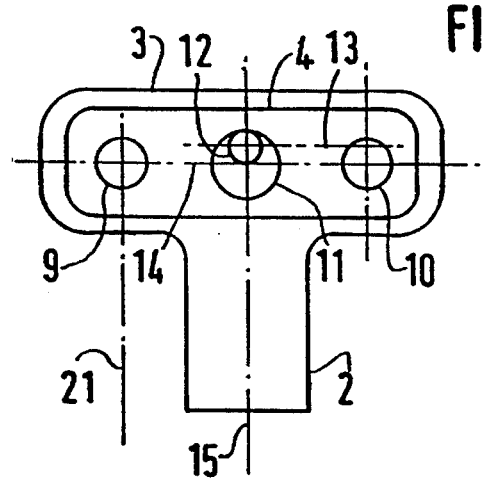
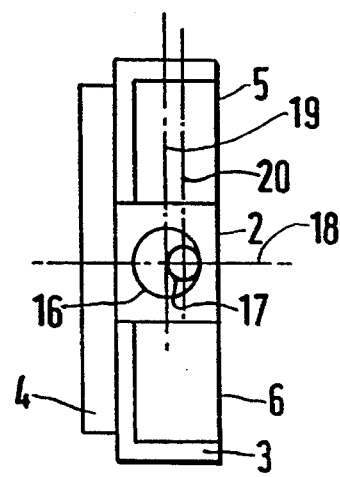
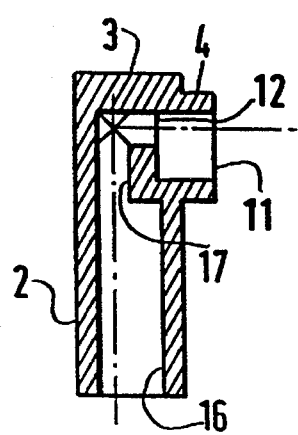
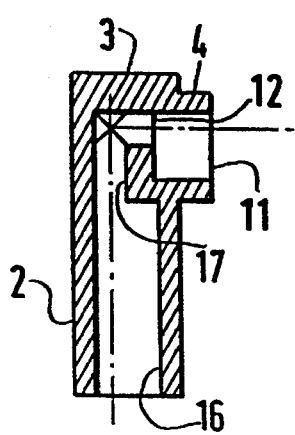

5,592,038

UNIT PROVIDING VENTILATION AND AN ELECTRICAL CONNECTOR INTENDED FOR AN ENVIRONMENTALLY SEALED MOTOR, AND AN ENVIRONMENTALLY SEALED MOTOR USING SUCH A UNIT

FIELD OF THE INVENTION

The present invention relates to a unit providing ventilation and an electrical connector for an environmentally sealed motor. It also relates to an environmentally sealed motor, especially a direct current motor, fitted with such a unit.

BACKGROUND OF THE INVENTION

It has already been proposed in the prior art to pass an electricity supply connector through a cover enclosing an environmentally sealed motor.

The electrical connector enables electrical energy to be transmitted from a power supply by means of a control panel, for example, to an electrical operating circuit, enabling the electricity supply for the motor to be supplied and controlled.

In particular, this operating circuit is connected to brushes which communicate with the commutator of the direct current electric motor.

On the other hand, environmentally sealed motors are entirely enclosed and it has proved to be necessary that firstly the internal and external pressures be as equal as possible, and that secondly the environmentally sealed motor is protected from moisture which may enter the motor or which may escape therefrom as a result of internal condensation.

With this in mind, the prior art describes solutions in which a baffle tube is disposed on the cover or adjacent thereto, and an electrical connector passes through the cover to supply electrical energy to the motor.

These arrangements of the prior art are expensive as firstly it is necessary for two separate units to be assembled, and secondly they are deceptive from the point of view of technical characteristics as two seals have to be provided at each opening of these two components.

The present invention provides a solution to these drawbacks of the prior art.

SUMMARY OF THE INVENTION

The present invention proposes a ventilation unit which is used as an electrical connector.

This unit is intended to be mounted on the cover of a direct current environmentally sealed motor or similar electric machine, and is characterised in that it comprises a plate having passages for electrical connecting pins to an electric circuit disposed inside the environmentally sealed motor, the plate being disposed on a cover for closing the motor and having an aperture for the passage of air provided with baffle-forming means.

The invention also relates to an environmentally sealed motor, especially a direct current motor, fitted with such a unit.

Other characteristics and advantages of the present invention will be better understood by studying the description and attached drawings.

BRIEF DESCRIPTION OF THE DRAWINGS

FIG. 1 is a perspective view of the unit according to a preferred embodiment of the invention;

FIGS. 2 to 4 are views of the unit shown in FIG. 1;

FIGS. 5 and 6 are partial sections of the device in FIG. 1;

DETAILED DESCRIPTION OF THE PREFERRED EMBODIMENT

Figure 7:
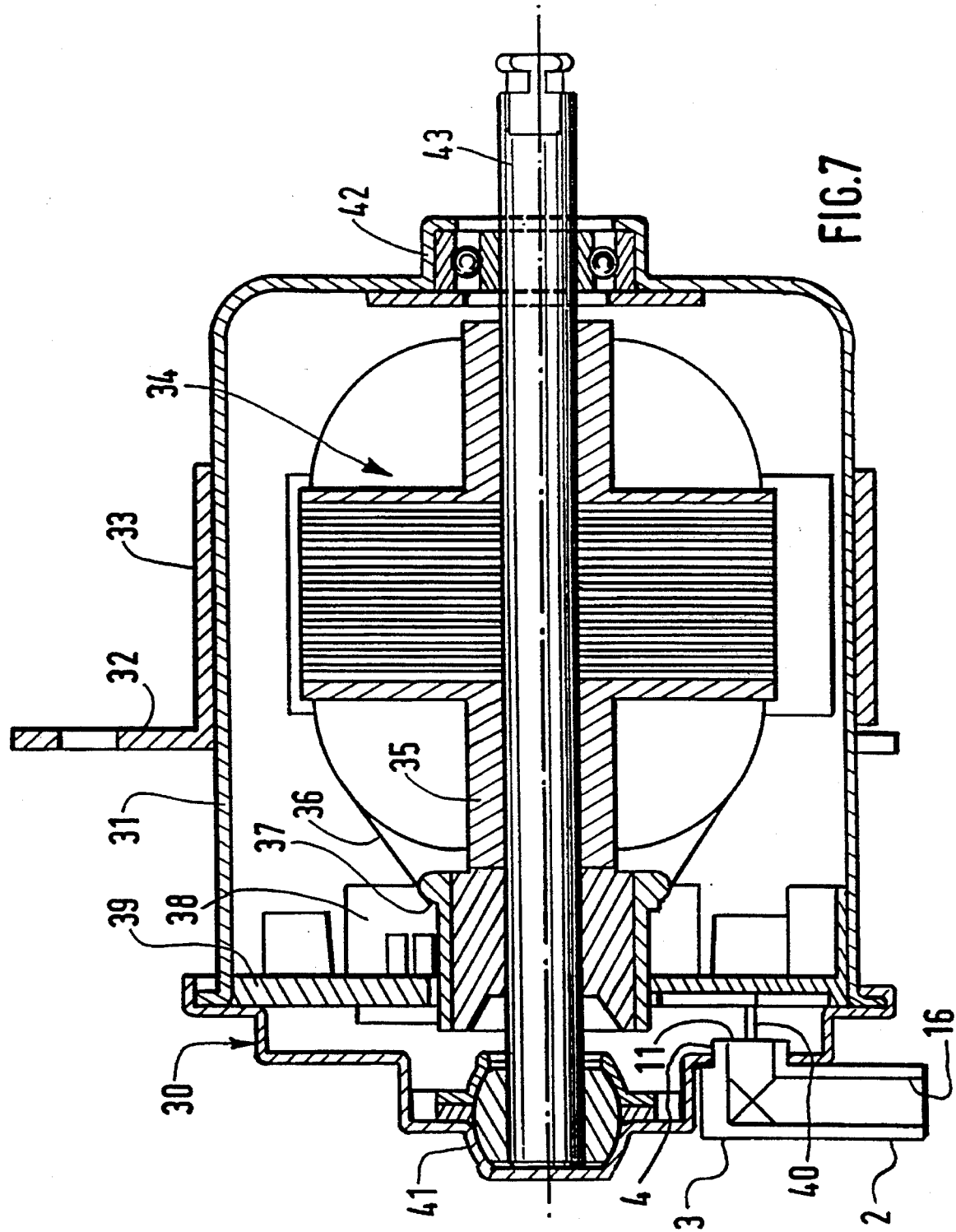
FIG. 7 is a general view of an environmentally sealed motor using the unit of the invention.

FIG. 1 shows a unit providing ventilation and an electrical connector, to be mounted on an environmentally sealed motor.

In FIG. 1, the unit comprises a plate 1 having passages 5 and 6 for electrical connecting pins, which are not represented in the drawings and which are attached to the operating circuit inside the environmentally sealed motor. In addition, the unit providing the ventilation and electrical connector comprises an air passage aperture 2, which in the preferred embodiment is formed by a tube having a square section.

Plate 1 comprises a rear face 4 having a reduced dimension so that it can fit into a corresponding aperture provided on the cover of the environmentally sealed motor (not shown).

The plate is limited by a skirt 3 which enables the volume of apertures or passages 5 and 6 through which electric connecting pins pass to be limited.

FIG. 2 shows a plan view of the unit in FIG. 1. The same components bear the same reference numbers. The through holes 7 and 8 for the connecting pins, which have not yet been installed, are shown.

FIG. 3 shows an underneath view in which the other face can be seen, which is situated inside the environmentally sealed motor and which has through apertures 9 and 10 corresponding to the through apertures 7 and 8 in the view of FIG. 2.

In FIG. 3, between the two through holes 9 and 10, can be seen two bores 11 and 12, which have the same vertical axis and two offset horizontal axes 13 and 14, the through hole 12 and the hole 11 having different diameters.

These two holes provide a baffle-forming means for the ventilation of the environmentally sealed motor. The hole 12 in fact communicates with a passage which passes through cylinder 2. This passage is aligned on the axis 15.

FIG. 4 shows another side view of the device in FIG. 1. It shows the square-section cylinder 2 equipped with bore or moulding holes 16 and 17, which have the same vertical axis 18 and two horizontal axes 19 and 20 respectively.

Hole 17 and hole 16 provide a second baffle-forming means in which the general direction is perpendicular to that of the means provided, in FIG. 3, by holes 11 and 12. Hole 17 communicates at right angles with hole 12 so as to provide the ventilation.

FIG. 5 shows a sectional view along axis 21 of FIG. 1. This shows the skirt 3, the aperture of which has a hole on a first face having the reference 9, and a second face having the reference 8 which opens into space 5. Thus the configuration of the plate for the pin connection can be seen.

FIG. 6 shows a section along axis 15 which can be seen in FIGS. 3 and 2. Along the cylinder 2 are shown apertures 16 and 17, which are formed by cylindrical bores in the material, or again by moulding around cylindrical cores corresponding to the shape of holes 16 and 17.

The direction of these holes is parallel to the direction of axis 15. On the other hand, perpendicular to this axis 15 are disposed two cylindrical holes having a circular section according to apertures 11 and 12 respectively formed in the same manner or by bores in the material or by moulding around corresponding cylindrical cores.

It is understood that the present invention may have several pairs of baffle-forming means, in particular by multiplying the right angles in the example shown in FIG. 6.

On the other hand, it is also possible to vary the baffle-forming means by using holes having a non-circular section or again by providing different directions in relation to the axis 15 and the perpendicular for the holes.

FIG. 7 shows a sectional view of an embodiment of an environmentally sealed motor incorporating the unit shown in FIGS. 1 to 6. The unit is shown fitted to a cover 30 which is tightly mounted on a casing 31. The sealed casing is mounted in an overring 33 having attachment lugs 32. These attachment lugs enable the motor to be attached to a support.

The motor comprises an armature formed principally by coils 34 installed in a rotating member formed mainly by magnetic plates enclosed by a plastic part 35 formed by two end plates which surround the axis of the rotor 43 and compress the assembly of sheets of rotor plates.

It also comprises an inductor formed by permanent magnets (not shown in the drawings).

The output wires of the coils 34 indicated at 36 are connected to a commutator 37 integral with the axis of rotation 43 which communicates with the brushes such as brush 38 mounted on a brush holder plate 39 as is known and which will not be described in further detail.

The brush holder plate 39 is mounted on the casing close to the cover. It comprises a number of electric circuits which enable the electrical supply to be brought in from outside the environmentally sealed motor to the brushes via braids (not shown).

These circuits are connected by pins 40 which are welded onto the brush holder plate 39 and which pass through apertures 7 or 8 (not shown) of unit 2, 3.

It will be noted that the brush holder plate is ventilated by means of the ventilation means formed mainly by the apertures 11 and 16 provided in unit 2, 3, as described in FIGS. 1 to 6.

Finally, the shaft is supported at one end in a spherical bearing 41 fitted in a suitable seat on the cover 30, and passes through an appropriate aperture in a plain or roller bearing 42 at the other end so as to have a free end which may be used especially as an attachment to a turbine when the environmentally sealed motor is used as a fan.

It is thus noted that the environmentally sealed motor of the invention only has a single passage enabling simultaneously the ventilation on the one hand and the electrical connection by the pins 40 on the other hand.

When the assembly of the motor is complete, the cover is installed in a suitable position with a sealing means on the aperture of the casing 31. It (the cover) has an aperture for the attachment of the unit 3, 2. Through this aperture extend two pins such as pin 40 which are spaced so as to be able to penetrate the interior of the holes 8 and 7 (FIG. 2) on the unit providing the ventilation and electrical connector according to the invention.

The unit 1, 2 is applied so that the pins 40 pass through the holes 7 and 8 so that the hooked part 4 enters the aperture provided for this purpose on the cover 30. A seal may be fitted on the unit so as to ensure that the cover is tight.

Finally, the electrical connection is made between the free end of the pins 40 inside the seats 5 and 6. Then protection is achieved by embedding the pins in a hardenable material such as resin in seats 5 and 6 so as to provide a permanent and tight attachment of the connecting wires to the connecting pins 40 so as to terminate the electric connector integrated in the unit providing ventilation and an electric connector.

The electric contact between the free end of the pin and the corresponding conductor of the cable may be provided by any means including, depending on circumstances:

the use of a conductive resin to embed the pin and the end of the conductor in the corresponding seat;

a known adaptation of the end of the pin to remove insulating material on the end of the corresponding conductor of the cable, before embedding the unit in its seat by the hardenable material;

electric welding by providing a welding material before embedding the unit in its seat by use of the hardenable material.

Of course, the shape of the seats and also their number and their distribution on the ventilation unit may be adapted to the circumstances without departing from the scope of the appended claims.

What is claimed is:

1. A unit providing ventilation and an electric connector, intended for an environmentally sealed electric machine that has a cover, comprising a plate having passages for electrical connecting pins to an electric circuit disposed inside said environmentally sealed machine, said plate being disposed on a cover of the machine, and incorporating an air passage aperture having baffle-forming means, in which the unit has at least two holes having different diameters formed therein, which holes open into and communicate with one another to form a baffle-forming means for ventilation, said two holes each having generally circular sections in which one of said holes is formed within the other of said holes and is in diametrical alignment therewith to enable the centers of said holes to be offset from each other.

2. A unit according to claim 1, in which the unit has at least two passages for electrical connecting means formed therein permitting the passage of connecting pins to said circuit.

3. A unit according to claim 2, wherein the pins passing through the electrical connector passages are connected to the connecting cable and are embedded in a settable material such as resin to provide a permanent and tight connection.

4. A unit according to claim 1, comprising a hooked part adapted to fit into a corresponding aperture in the cover.

5. A unit according to claim 1, further comprising a cover for the electric machine, a casing for the electric machine, wherein the plate provides ventilation and an electrical connector for the electrical machine.

6. A unit according to claim 5, comprising a brush holder plate, pins mounted on the brush holder plate which pass through the electrical connecting pin passages in the plate of the ventilation unit to provide the electrical connector.

7. A unit providing ventilation and an electrical connector, intended for an environmentally sealed electric machine, comprising a plate having passages for electrical connecting pins to an electric circuit disposed inside said environmentally sealed machine, said plate being disposed on a cover of the machine, and incorporating an air passage aperture having baffle-forming means, the unit having at least two holes having different diameters formed therein which holes open into and communicate with one another to form a baffle-forming means for ventilation, a square section pillar having apertures with directions substantially perpendicular to the direction of said two holes, said pillar having an opening into one of said apertures to complete the baffle-forming means.

* * * * *